May 22, 1928.
R. G. ANDERSON
LOCOMOTIVE OR CAR TRUCK
Filed Feb. 11, 1926
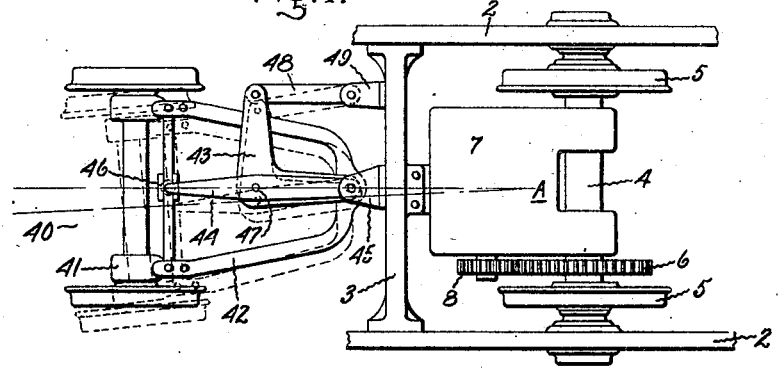
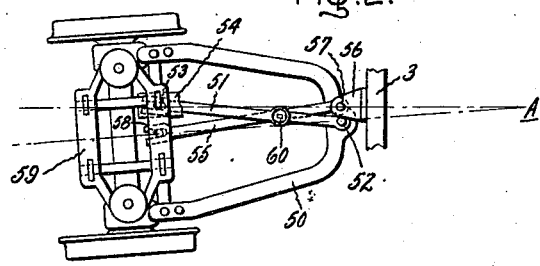
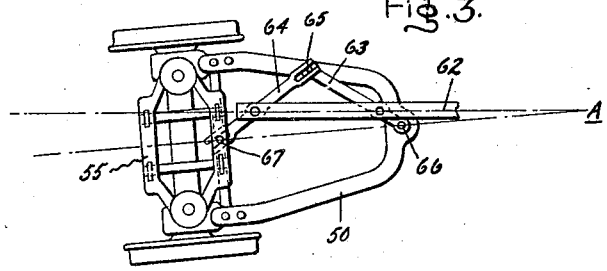
Inventor:
Robert G. Anderson,
by
His Attorney.

Patented May 22, 1928.

1,670,706

UNITED STATES PATENT OFFICE.

ROBERT G. ANDERSON, OF WEST ALBANY, NEW YORK, ASSIGNOR TO GENERAL ELECTRIC COMPANY, A CORPORATION OF NEW YORK.

LOCOMOTIVE OR CAR TRUCK.

Application filed February 11, 1926. Serial No. 87,667.

My invention relates to locomotives or cars of the kind having guiding trucks of the radius bar type, which guiding trucks have a limited lateral movement relative to the locomotive or car body and which assist the same in rounding curves. In certain cases, particularly in large modern locomotives, it has been found that the over-all dimensions are so limited that the desired length of radius bar for the best operation of the guiding truck cannot be obtained. Especially is this true in the case of large electric locomotives where, by reason of the length limitation referred to, the pivotal center of the radius bar of the desired length would come in the space occupied by one of the driving motors. It is an object of my invention, therefore, to provide an improved locomotive or car truck construction wherein the above mentioned difficulties are overcome and in which the guiding truck may be connected to a main truck or to the body of the locomotive or car so as to swing about a point having any desired location with respect to the guiding truck.

My invention will be better understood from the following description taken in connection with the accompanying drawing, and its scope will be pointed out in the appended claims.

Fig. 1 is a plan view of a portion of a locomotive embodying my improved guiding truck; Figs. 2 and 3 are modifications of the guiding truck shown in Fig. 1.

Referring to the form of my invention shown in Fig. 1, the guiding truck 40, illustrated as a pony truck, is shown by full lines in the position it takes when the locomotive is on a tangent and by dotted lines in its position when the locomotive is on a curve. The frame 41 of the pony truck has fixed thereto the extremities of a substantially V-shaped radius bar 42, to the central portion of which is pivoted one arm of the bell crank 43. Lever 44 is pivotally connected at one end to the bracket 45 carried by the cross tie 3 of the main truck and is attached at its other end to a part of the pony truck frame by a connection 46 which permits slight relative movement in the direction of the lever. Bell crank 43 and lever 44 are pivoted together at 47 and the link 48 connects the other arm of the bell crank with the bracket 49 on the cross tie 3. When the locomotive or car reaches a curve and the pony truck is deflected thereby the parts of the mechanism cooperate to cause the pony truck to swing about an axis A which, as shown, is located beyond the end of the radius bar 42, in the present case passing through the driving motor 7. By varying the proportion of parts, as for example the length of the longitudinal arm of the bell crank and the length of the link 48 whereby the pivotal point 47 is brought closer to the pony truck, the position of the axis A about which the pony truck swings may be moved forward or backward at will.

In the modification illustrated by Fig. 2, the pony truck is provided with a radius bar 50 similar to that shown in Fig. 1, but a different means of connection with the main truck is provided. Here the lever 51 is pivoted at one end to the radius bar 50 at 52 and at the other end has a form of pin-and-slot connection 53 with the portion 54 of the main truck or locomotive body and arranged on the longitudinal center thereof. The lever 55 is pivoted at one end to the bracket 56 on the cross tie 3 of the main truck or body at 57 and at the other end has a form of pin-and-slot connection 58 with the frame 59 of the pony truck. The two levers 51 and 55 are pivotally connected together at 60. As in the preceding form of my invention, the pony truck is constrained to swing about an axis A located beyond the limits of the radius bar and the position of this axis may be changed at will by varying the proportions of the lever arms.

Fig. 3 shows still another modification applied to a pony truck. According to this form the pony truck frame 55 has a radius bar 50 fixed thereto as in Fig. 2. The part 62 of the main truck or of the body of the locomotive or car has pivoted thereto the levers 63 and 64, which have a form of pin-and-slot connection 65 with each other. Lever 63 is pivoted to the radius bar at 66 and lever 64 has a form of pin-and-slot connection at 67 with the frame 55 of the pony truck. As in the preceding forms, the pony truck of this modification will swing about the axis A located beyond the radius bar and its position may be varied by varying the arms of the levers 63 and 64.

While I have shown these forms of my invention illustrated as applied only to a pony truck, it will be apparent to those skilled in the art that they are not limited to a twowheeled truck, but are equally applicable to a bogie truck having four or more wheels.

While I have described certain embodiments of my invention, I do not wish to be limited to the particular forms shown and described, as it will be apparent that many modifications therein may be made without departing from the scope of my invention as set forth in the appended claims.

What I claim as new and desire to secure by Letters Patent of the United States is:

1. In a locomotive or car having a body, a guiding truck, and means for moving said truck angularly with respect to said body in response to lateral movement of the former relative to the latter, said means including two levers pivotally connected together, each of said levers being pivotally connected to said truck independent of the other.

2. In a locomotive or car having a body, a guiding truck, and means for moving said truck angularly with respect to said body in response to lateral movement of the former relative to the latter, said means including two levers pivotally connected together, each of said levers being pivotally connected independent of the other to said truck and to said body.

3. In a locomotive or car having a body, a guiding truck, and means for moving said truck angularly with respect to said body in response to lateral movement of the former relative to the latter, said means including levers pivotally connected together intermediate the ends thereof.

4. In a locomotive or car having a body, a guiding truck, and means for moving said truck angularly with respect to said body in response to lateral movement of the former relative to the latter, said means including levers pivotally connected together intermediate the ends thereof, each of said levers being pivotally connected independent of the other to said truck.

5. In a locomotive or car having a body, a guiding truck, and means for moving said truck angularly with respect to said body in response to lateral movement of the former relative to the latter, said means including levers pivotally connected together intermediate the ends thereof, each of said levers being pivotally connected independent of the other to said truck and to said body.

6. In a locomotive or car having a body, a guiding truck, and means for moving said truck angularly with respect to said body in response to lateral movement of the former relative to the latter, said means including levers pivotally connected together intermediate the ends thereof, the opposite ends of each lever being pivotally connected to said body and to said guiding truck respectively.

7. In a locomotive or car having a body, a guiding truck, and means for moving said truck angularly with respect to said body in response to lateral movement of the former relative to the latter, said means including levers pivotally connected together intermediate the ends thereof, each lever being pivotally connected independent of the other at one end to said body and at the other end to said guiding truck.

In witness whereof, I have hereunto set my hand this 10th day of February, 1926.

ROBERT G. ANDERSON.